3,029,253
ALUMINUM CHLORIDE SOLUTIONS
Edward N. Wheeler and Gene J. Fisher, Corpus Christi, Tex., assignors to Celanese Corporation of America, New York, N.Y., a corporation of Delaware
No Drawing. Filed June 20, 1958, Ser. No. 743,469
4 Claims. (Cl. 260—343.9)

This invention relates to a new and useful catalyst composition. More particularly this invention relates to aluminum chloride solutions adapted to be the catalyst for the preparation of beta propiolactone.

Anhydrous aluminum chloride is so well known as a catalyst that it has been made the subject for American Chemical Society Monograph No. 87, "Anhydrous Aluminum Chloride in Organic Chemistry," by C. A. Thomas, Reinhold Publishing Co., New York, 1941.

In keeping therewith, many patents suggest carriers for aluminum chloride. Patent No. 2,379,687, for example, suggests a mixture of aluminum chloride and pyridine hydrochloride. Patent No. 1,999,345 suggests aluminum chloride and cresylic acid. Patent No. 2,644,798 suggests a modified aluminum chloride suspended in methyl chloride. Other patents suggest particular aluminum chloride compositions relative to catalysis of specific reactions. Thus, Patent 2,085,535 suggests catalyzing a polymerization by aluminum chloride dissolved in a sulfone, a ketone or a nitroparaffin. Patent No. 2,422,798 suggests catalyzing an alkylation process by a solution of aluminum chloride in an olefinic ketone.

As a result of all the prior art activity on aluminum chloride compositions, further investigation of aluminum chloride carriers would appear to offer small hope for significant improvements predicated solely on the catalyst carrier or solvent. Ordinarily the carrier is nothing more than a diluent for the catalyst, and may in fact constitute a contaminant in the ultimate product. At any rate, patents directed to the preparation of beta lactones (from ketones and carbonyl compounds) with aluminum chloride as the catalyst accord little emphasis ot the carrier for the catalyst. In particular, Patents 2,356,459 and 2,424,590 propose a large list of suitable catalyst solvents including: acetone, diethyl ether, methyl-ethyl ether, dioxane, ethyl chloride, ethylene dichloride, carbon disulfide or the like.

The lactone product itself has been used as the medium for carrying out the reaction (as in Patent No. 2,424,589). This is effective but in a continuous process requiring a continual addition of catalyst it is not convenient, or even safe, to add the catalyst in solid form to the reaction mixture or to prepare the necessary supply of solution of the catalyst in the highly reactive lactone. Accordingly, in continuous processes the aluminum chloride has been first dissolved in a carrier solvent and then the resulting solution has been added to reaction medium during the course of the reaction. Acetone, and to a lesser extent ether, appear to have been preferred as carrier solvents.

Notwithstanding such preferences, employment of acetone as the catalyst carrier poses many problems to the art. Acetone solutions of aluminum chloride are unstable; they darken rapidly and will gel overnight at room temperatures. For preparation of beta propiolactone on a commercial basis it has heretofore been necessary to make up a fresh catalyst solution every two to three hours. Moreover the 5% acetone solution of aluminum chloride customarily employed is relatively dilute. In the ultimately produced beta propiolactone, acetone from the catalyst solution constitutes a significant contaminant amounting roughly to 3% of the product.

These disadvantages were so serious as to warrant complete re-investigation of solvents for aluminum chloride in effect to discover a more satisfactory catalyst composition.

An object of the instant invention is to improve the production of beta propiolactone through catalysis with an aluminum chloride solution.

Other objects and advantages of this invention will be apparent from the more detailed description which follows.

In accordance with one aspect of this invention a lower aliphatic ester is used to dissolve the aluminum chloride. This makes possible the use of high concentrations of aluminum chloride in the solvent, for example solutions containing, in the case of ethyl acetate, up to about 35% by weight of anhydrous aluminum chloride. Other catalytic ingredients such as zinc chloride may also be present in lesser amounts. Thus zinc chloride, ferric chloride, stannic chloride, titanium tetrachloride, cadmium chloride and mercuric chloride may be present.

The preferred solvent for use in this invention is ethyl acetate, but other esters of lower fatty acids may be employed, for example, methyl acetate, n-propyl acetate, n-butyl formate, ethyl propionate. While esters of primary alcohols are preferred esters of secondary alcohols, e.g. isopropyl acetate or sec-butyl acetate may also be used.

With the avialable wealth of prior art relating to catalyst uses for aluminum chloride and relating to carriers for aluminum chloride, it is somewhat surprising that the lower aliphatic esters have been left unexplored heretofore. Without being bound thereto, it is theorized that this significant omission can be attributed to an erroneous statement in the Thomas text, namely a report that aluminum chloride is insoluble in ethyl acetate. To the contrary, aluminum chloride is in fact highly soluble in ethyl acetate. Moreover in a sharp contrast to the overnight gelation of acetone solutions of aluminum chloride, seven months of storage of a 16% aluminum chloride in ethyl acetate at room temperature resulted in essentially no change in color or odor. (Under the same storage conditions, methyl acetate solutions were found to be somewhat less stable, the color changing from light yellowish brown to a darker brown and a noticeable acrid odor developing.) Furthermore, the ester solutions are just as active catalytically, for the preparation of propiolactone, as freshly prepared acetone solutions, and a reasonable storage of the ester solutions does not effect their catalytic activity. In preparing beta propiolactone, or other lactones from ketenes and carbonyl compounds, using the ester solutions of this invention, the reactants and conditions disclosed by the prior art may be used.

An important advantage of the ester solutions lies in the attainment of higher aluminum chloride concentrations. In the preparation of propiolactone it has heretofore been the practice to add the catalyst as an acetone solution containing 5% aluminum chloride and 0.5% zinc chloride. Employment of this solution resulted in a propiolactone product contaminated with about 3% by weight of acetone. Employment of an ethyl acetate solution containing 16% by weight of aluminum chloride and 1.6% zinc chloride reduced the level of product contamination by the catalyst solvent to below about 1%. It is desirable in the practice of this invention to use a catalyst solution containing above 5%, preferably above 7% of the dissolved aluminum chloride.

An operating advantage exists, as well, because the acetone solutions of catalyst had to be freshly prepared every two to three hours, while without sacrificing catalytic activity ester solutions can be prepared the night before in sufficient quantities to take care of the following day's run.

In making the catalyst solution it is sufficient to merely agitate the solvent and catalyst together. Preferably the mixture is cooled to remove the exothermic heat of solution. The solution should be substantially anhydrous to preserve its catalystic activity.

Following are specific examples demonstrating the practice of the instant invention.

Example I

A solution of aluminum chloride and zinc chloride in ethyl acetate was prepared by adding 50 lbs. of anhydrous aluminum chloride and 5 lbs. of anhydrous zinc chloride to 430 lbs. of ethyl acetate at a temperature of 10° C. with cooling to maintain the mixture at this temperature. 61 lbs. of the resultant solution of catalyst was admixed with 4200 lbs. of beta propiolactone. Thereafter an equi-molar mixture of gaseous formaldehyde and ketene was passed through the solution at the rate of about 1400 lbs. per hour, the reaction mixture being maintained at a temperature of 15° C. The reaction was carried out continuously, with a continuous feed of formaldehyde and ketene, and a continuous makeup supply of catalyst solution to maintain a constant concentration of catalyst so that steady state conditions prevail, in conventional manner. Beta propiolactone was obtained in excellent yields.

Example II

A solution of aluminum chloride and zinc chloride in ethyl acetate was prepared by adding 35 lbs. of anhydrous aluminum chloride and 3.5 lbs. of anhydrous zinc chloride to 430 lbs. of methyl acetate at a temperature of 10° C. with cooling to maintain the mixture at this temperature. 85 lbs. of the resultant solution of catalyst was admixed with 4200 lbs. of beta propiolactone. Thereafter an equi-molar mixture of gaseous formaldehyde and ketene was passed through the solution at the rate of about 1400 lbs. per hour, the reaction mixture being maintained at a temperature of 15° C. The reaction was carried out continuously, with a continuous feed of formaldehyde and ketene, and a continuous makeup supply of catalyst solution to maintain a constant concentration of catalyst so that steady state conditions prevail, in conventional manner. Beta propiolactone was obtained in excellent yields.

It is to be understood that the foregoing detailed description is given merely by way of illustration and that many variations may be made therein without departing from the spirit of our invention.

Having described our invention, what we desire to secure by Letters Patent is:

1. In an aluminum chloride catalyzed process for preparing lactones by reaction of a ketene with an aldehyde, the improvement which comprises supplying the aluminum chloride in the form of a solution thereof in an ester of a lower alkanol and a lower fatty acid.

2. In the process of synthesizing beta propiolactone by reaction of ketone with formaldehyde in the presence of an aluminum chloride-zinc chloride catalyst, the improvement which comprises employing ethyl acetate as the carrier for the aluminum chloride zinc chloride catalyst.

3. In the process of synthesizing beta propiolactone by passing ketene and formaldehyde continuously through a reaction zone containing beta propiolactone and an aluminum chloride-zinc chloride catalyst while adding a make-up of said catalyst to said zone, the improvement which comprises dissolving said catalyst in ethyl acetate and using the resulting solution for said addition.

4. Process as set forth in claim 3 in which said solution in ethyl acetate contains more than 5% of dissolved aluminum chloride.

References Cited in the file of this patent

UNITED STATES PATENTS

| | | |
|---|---|---|
| 2,424,589 | Steadman | July 29, 1947 |
| 2,542,610 | Young | Feb. 10, 1951 |
| 2,581,147 | Schutze | Jan. 1, 1952 |
| 2,675,392 | Thiobald | Apr. 13, 1954 |
| 2,763,664 | Sixt | Sept. 18, 1956 |